United States Patent
Takai et al.

(10) Patent No.: US 8,749,508 B2
(45) Date of Patent: Jun. 10, 2014

(54) PROTECTIVE PANEL AND ELECTRONIC DEVICE

(75) Inventors: Yuichiro Takai, Kyoto (JP); Takao Hashimoto, Kyoto (JP); Kazuhiro Nishikawa, Kyoto (JP); Yoshihiro Kai, Kyoto (JP); Yuko Endo, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 13/699,344

(22) PCT Filed: May 16, 2011

(86) PCT No.: PCT/JP2011/061152
§ 371 (c)(1),
(2), (4) Date: Nov. 21, 2012

(87) PCT Pub. No.: WO2011/148804
PCT Pub. Date: Dec. 1, 2011

(65) Prior Publication Data
US 2013/0063387 A1    Mar. 14, 2013

(30) Foreign Application Priority Data

May 24, 2010  (JP) ................................. 2010-117943

(51) Int. Cl.
*G06F 3/041* (2006.01)

(52) U.S. Cl.
USPC .......................................... 345/173; 345/178

(58) Field of Classification Search
CPC ..... G06F 3/041; G06F 3/03547; G06F 3/045; G06F 3/0489
USPC ................ 345/87, 173–184, 204; 349/12, 24
See application file for complete search history.

(56) References Cited

U.S. PATENT DOCUMENTS

| | | | |
|---|---|---|---|
| 5,260,626 A * | 11/1993 | Takase et al. | 315/85 |
| 5,668,576 A * | 9/1997 | Ikura et al. | 345/173 |
| 6,185,108 B1 * | 2/2001 | Okura et al. | 361/816 |
| 6,556,189 B1 * | 4/2003 | Takahata et al. | 345/173 |
| 6,847,355 B1 | 1/2005 | Nishikawa et al. | |
| 7,009,663 B2 * | 3/2006 | Abileah et al. | 349/12 |

(Continued)

FOREIGN PATENT DOCUMENTS

| | | |
|---|---|---|
| CN | 101361035 | 2/2009 |
| CN | 101379459 | 3/2009 |

(Continued)

OTHER PUBLICATIONS

International Preliminary Report on Patentability issued Dec. 20, 2012 in International (PCT) Application No. PCT/JP2011/061152.
International Search Report issued Aug. 16, 2011 in corresponding International (PCT) Application No. PCT/JP2011/061152.
Chinese Office Action along with English translation issued Jul. 2, 2013 in corresponding Chinese Application No. 201180025033.6.
Extended European Search Report issued Jan. 2, 2014 in corresponding European Application No. 11786503.0.

*Primary Examiner* — Prabodh M Dharia
(74) *Attorney, Agent, or Firm* — Wenderoth, Lind & Ponack, L.L.P.

(57) ABSTRACT

A pressure sensitive conductive member is arranged in a through hole of a base-material bonding layer so as to be in contact with a peripheral-switch upper electrode and a peripheral-switch lower electrode, and when a force applied to a peripheral switch is transmitted to the pressure sensitive conductive member through an upper electrode base material and the upper electrode, a current flows, so that the upper electrode and the lower electrode are electrically connected.

9 Claims, 8 Drawing Sheets

(56) References Cited

U.S. PATENT DOCUMENTS

| | | | |
|---|---|---|---|
| 7,920,225 B2* | 4/2011 | Nishikawa et al. | 349/60 |
| 8,063,886 B2 | 11/2011 | Serban et al. | |
| 8,077,264 B2* | 12/2011 | Nishikawa et al. | 349/12 |
| 8,134,652 B2* | 3/2012 | Rho et al. | 349/12 |
| 8,279,188 B2* | 10/2012 | Kusuda et al. | 345/173 |
| 8,436,823 B2* | 5/2013 | Kanehira et al. | 345/173 |
| 8,482,537 B2 | 7/2013 | Shimizu et al. | |
| 2002/0056918 A1 | 5/2002 | Saito | |
| 2005/0139398 A1* | 6/2005 | Endo | 178/18.01 |
| 2008/0048995 A1* | 2/2008 | Abileah et al. | 345/173 |
| 2009/0160789 A1 | 6/2009 | Kreit et al. | |
| 2010/0053854 A1* | 3/2010 | Nishikawa et al. | 361/679.01 |
| 2010/0289771 A1 | 11/2010 | Nozawa | |
| 2011/0115738 A1 | 5/2011 | Suzuki et al. | |
| 2011/0267301 A1 | 11/2011 | Shimizu et al. | |

FOREIGN PATENT DOCUMENTS

| | | |
|---|---|---|
| CN | 101490642 | 7/2009 |
| EP | 1 106 977 | 6/2001 |
| EP | 2 182 429 | 5/2010 |
| JP | 2002-023955 | 1/2002 |
| JP | 2009-48559 | 3/2009 |
| WO | 2009/025269 | 2/2009 |
| WO | 2009/078391 | 6/2009 |
| WO | 2010/074116 | 7/2010 |

* cited by examiner

Fig. 6D

PROTECTIVE PANEL AND ELECTRONIC DEVICE

TECHNICAL FIELD

The present invention relates to a protective panel including a touch input part and a peripheral switch arranged in the peripheral part thereof, and an electronic device including the protective panel.

BACKGROUND ART

There are various kinds of well-known protective panels (called a touch window in this company) in which a switch part is arranged in the peripheral part of an input part of an analog resistive film system (refer to Patent Literature 1, for example).

The switch part is provided such that contact points positioned in peripheral parts of a front face side substrate and a rear face side substrate are opposed to each other with a predetermined space in an opening provided in a bonding layer to bond both substrates, and the contact points are brought into contact with each other by strongly pressing down the front face side substrate into the opening.

CITATION LIST

Patent Literature

Patent Literature 1: Japanese Unexamined Patent Publication No. 2009-48559

SUMMARY OF THE INVENTION

Technical Problem

However, since the protective panel has the space between the contact points, the switch part of the front face side substrate largely gets dented with age, and the front face side substrate is curved, which causes a problem that an outer appearance deteriorates, and the contact points are brought into contact with each other at the time of inputting, which causes a problem in durability of the curved contact point.

Therefore, it is an object of the present invention to solve the problems and to provide a protective panel and an electric device, in which a switch part of a front face side substrate does not largely get dented with age, so that an outer appearance can be prevented from deteriorating, and a surface side contact point part is not largely warped, so that there is no problem in durability of the contact point.

Solution to Problem

The present invention is configured as follows to attain the above object.

According to a first aspect of the present invention, there is provided a protective panel provided with a touch input part, and a peripheral switch arranged in a peripheral part thereof, comprising:

an upper electrode base material having a touch-input-part upper transparent electrode and a peripheral-switch upper electrode on one surface thereof;

a lower electrode base material having a touch-input-part lower transparent electrode opposed to the touch-input-part upper transparent electrode with a predetermined space to constitute the touch input part, and a peripheral-switch lower electrode opposed to the peripheral-switch upper electrode with a predetermined space to constitute the peripheral switch, on a surface opposed to the surface having the touch-input-part upper transparent electrode and the peripheral-switch upper electrode;

a base-material bonding layer that bonds the upper electrode base material and the lower electrode base material in a peripheral part, and has a through hole to which each of the peripheral-switch upper electrode and the peripheral-switch lower electrode is exposed; and a pressure sensitive conductive member arranged in the through hole in the base-material bonding layer, between the peripheral-switch upper electrode and the peripheral-switch lower electrode, and being in contact with at least one of the peripheral-switch upper electrode and the peripheral-switch lower electrode, wherein when a force is applied to a part corresponding to the peripheral switch, the applied force is transmitted to the pressure sensitive conductive member through the peripheral-switch upper electrode, conductive performance is changed and a current flows in the pressure sensitive conductive member by the applied force, and the peripheral-switch upper electrode and the peripheral-switch lower electrode are electrically connected due to a current flow.

According to a second aspect of the present invention, there is provided the protective panel according to the first aspect, wherein the pressure sensitive conductive member is constructed by a insulating coated film containing dispersed conductive particles, and when a force is applied to the part corresponding to the peripheral switch, the applied force is transmitted to the insulating coated film through the peripheral-switch upper electrode, a current flows between the conductive particles in the insulating coated film by the applied force, and the peripheral-switch upper electrode and the peripheral-switch lower electrode are electrically connected due to a current flow.

According to a third aspect of the present invention, there is provided the protective panel according to the first or second aspect, wherein the pressure sensitive conductive member has translucency, and each of the peripheral-switch upper electrode and the peripheral-switch lower electrode has translucency.

According to a fourth aspect of the present invention, there is provided the protective panel according to any one of the first to third aspects, further comprising a decorative sheet arranged on a front surface side of the upper electrode base material, wherein an input part of the peripheral switch is covered with a picture of the decorative sheet.

According to a fifth aspect of the present invention, there is provided the protective panel according to any one of the first to fourth aspects, comprising a sensitivity adjusting gap provided between a pressure sensitive conductive member and the peripheral-switch upper electrode, or between the pressure sensitive conductive member and the peripheral-switch lower electrode.

According to a sixth aspect of the present invention, there is provided the protective panel according to any one of the first to fourth aspects, comprising a sensitivity adjusting gap provided in a middle part of the pressure sensitive conductive member between the peripheral-switch upper electrode and the peripheral-switch lower electrode.

According to a seventh aspect of the present invention, there is provided an electronic device comprising:

the protective panel according to any one of the first to sixth aspects;

a casing that supports the protective panel; and a display device arranged in an inner side of the touch input part of the protective panel in the casing.

Advantageous Effects of Invention

According to the present invention, since the pressure sensitive conductive member is arranged in the through hole provided between the upper electrode base material and the lower electrode base material, and a volume in the through hole only slightly changes when the peripheral switch is pressed, the part of the peripheral switch on the upper electrode base material does not largely get dented with age and the upper electrode base member is not warped, so that the outer appearance can be prevented from deteriorating.

In addition, as for the peripheral switch, conductive performance of the pressure sensitive conductive member changes based on a pressed amount, so that strength (change) of the pressed force can be detected in addition to the detection of ON/OFF.

In addition, the pressure sensitive conductive member prevents the electrode of the upper electrode base material from being warped, so that the upper transparent electrode base member is not constantly warped, and there is no problem in durability of the contact point.

Furthermore, since the pressure sensitive conductive member is arranged, and the volume in the through hole only slightly changes when the peripheral switch is pressed, as described above, it is not necessary to strongly press down the upper electrode base material into the through hole until the contact points are brought into contact with each other, so that the switch input can be performed with a small pressed force.

In addition, since it is not necessary to strongly press down the upper electrode base material into the through hole until the contact points are brought into contact with each other, a large opening size to largely deform the upper electrode base material is not needed. Therefore, the switch part area can be smaller, and the space is saved.

In addition, since it is not necessary to strongly press down the upper electrode base material into the through hole until the contact points are brought into contact with each other, an opening shape of the through hole is not limited to a shape which is suitable for largely deforming the upper electrode base material. Therefore, a degree of freedom of the design of the switch can be increased.

In addition, since it is not necessary to strongly press down the upper electrode base material into the through hole until the contact points are brought into contact with each other, the size of the switch can be smaller than a fingertip.

BRIEF DESCRIPTION OF THE DRAWINGS

These and other objects and features of the present invention will become more apparent from the following description of preferred embodiments, with reference to the accompanying drawings, in which.

DESCRIPTION OF EMBODIMENTS

Hereinafter, embodiments according to the present invention will be described with reference to the drawings.

First Embodiment

Figure 1:
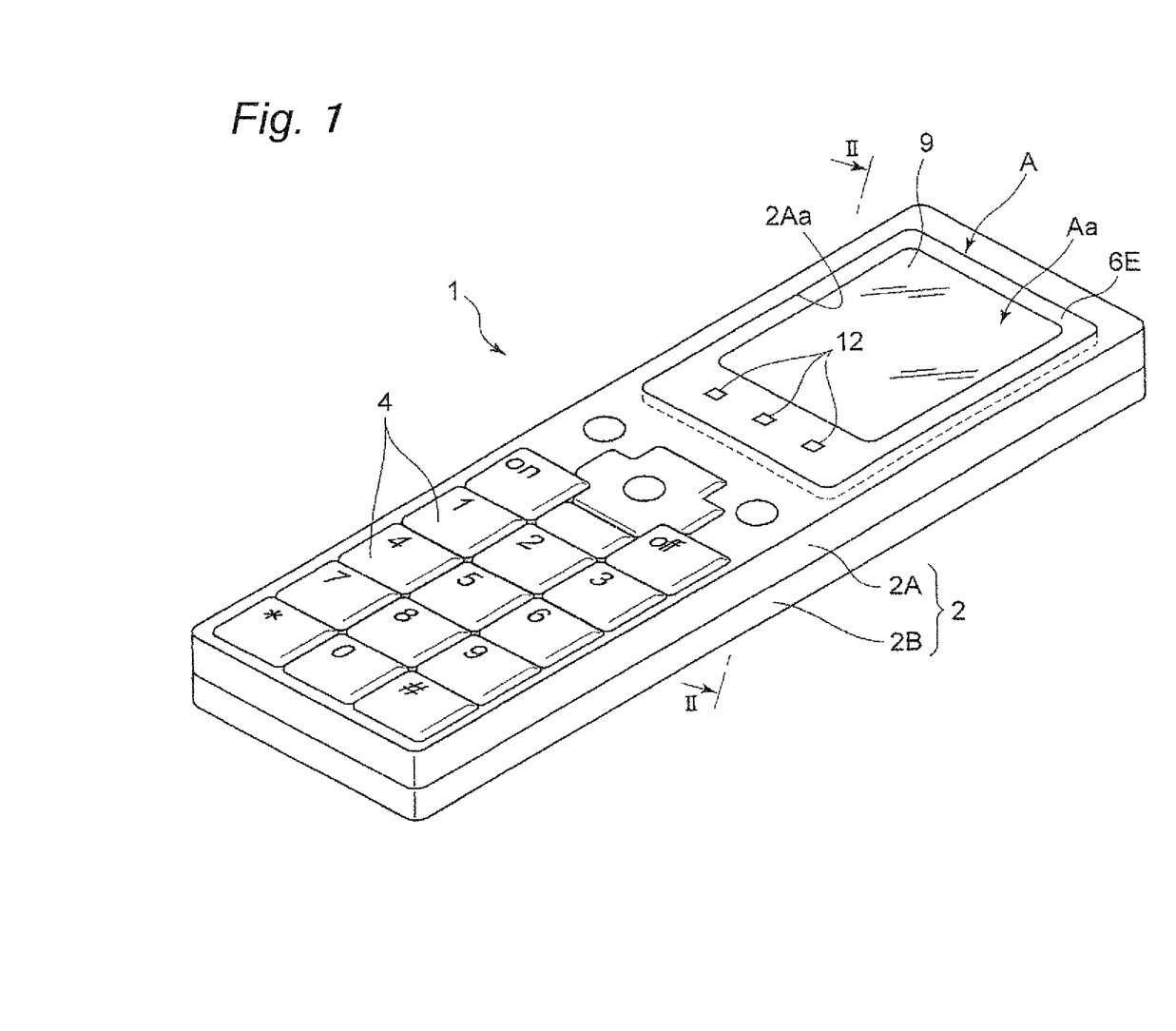
FIG. 1 is a perspective view of a mobile telephone having a touch input part peripheral switch according to a first embodiment of the present invention.
Figure 2:
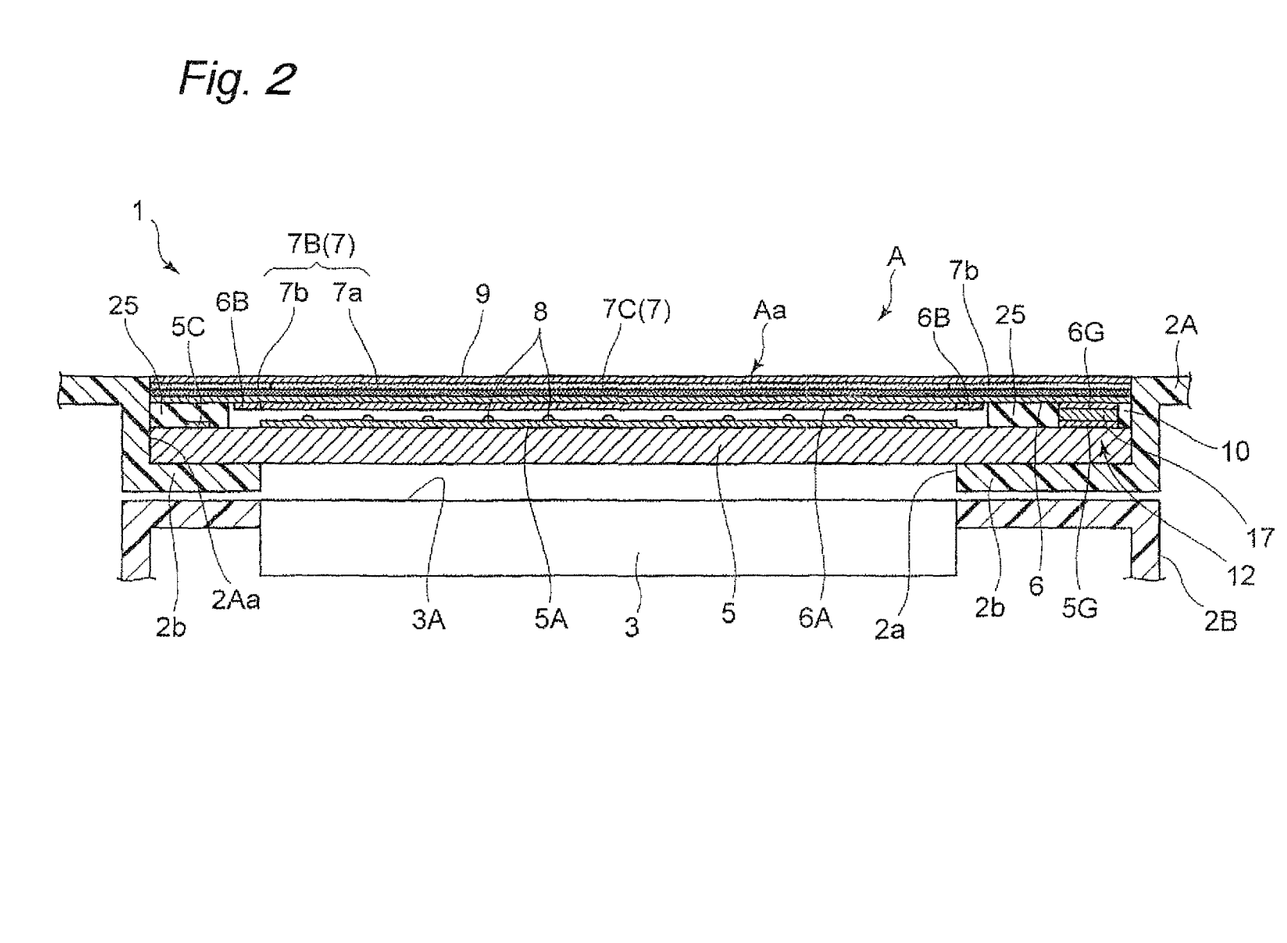
FIG. 2 is a transverse cross-sectional view showing a configuration of a protective panel in FIG. 1 and taken along line II-II in FIG. 1.

FIG. 1 is an overall perspective view of a mobile telephone 1 serving as an example of an electronic device including a protective panel according to a first embodiment of the present invention. FIG. 2 is transverse bottom view of a part of the mobile telephone 1. As shown in the figures, the mobile telephone 1 includes a display device 3 having a liquid crystal or organic EL display part 3A, a protective panel A arranged so as to cover the display device 3, and a plurality of input keys 4, in a casing 2 made of a synthetic resin. The casing 2 includes a front side casing part 2A in which a display window recessed part 2Aa and the like are formed in its front surface, and a rear side casing part 2E in which the display device 3 and the like are provided, but its configuration is not limited thereto and the casing 2 may be composed of an integrated casing part. The protective panel A is provided in the display window recessed part 2Aa in the front side casing part 2A so as to protect the display part 3A of the display device 3.

The display window recessed part 2Aa of the front side casing part 2A is formed by denting a surface of the front side casing part 2A so as to have a difference in level to allow the protective panel A to fit in. A bottom part of the display window recessed part 2Aa includes an opening 2a to allow the display part 3A of the display device 3 provided in the rear side casing part 2B to be exposed to the outside, and a support frame 2b to support the protective panel A.

A shape or size of the display window recessed part 2Aa can be variously changed depending on a shape or a size of the protective panel A. A depth of the display window recessed part 2Aa can be variously changed depending on a thickness and the like of the protective panel A. A shape or size of the opening 2a in the display window recessed part 2Aa can be variously changed depending on a shape or size of the display part 3A. Here, the shapes of the display window recessed part 2Aa, the opening 2a, the display part 3A, and the protective panel A are set to be a rectangular shape or substantially rectangular shape. In addition, the depth of the display window recessed part 2Aa is set such that a surface of the casing 2 and a surface of the protective panel A are the same in height, and the surface of the protective panel A and the surface of the casing 2 form a same plane after the protective panel A has been fit in the display window recessed part 2Aa.

The protective panel A includes a touch input part Aa, and one or more peripheral switches 12 arranged in a periphery of the touch input part Aa. Examples of the peripheral switch 12 include an icon switch, a navigation switch, or the like. For example, the touch input part Aa is a part having a touch input function of an analog resistive film system, and based on a touch operation on the surface of the protective panel A, the input part has a function of detecting X-Y coordinates of a touched position by a potential gradient. For example, the peripheral switch 12 may be an ON/OFF switch such as an ON/OFF switch to turn on the mobile telephone or an ON/OFF switch to listen to music, or a pressure sensitive switch such as a switch to detect a pressed force. The peripheral switch 12 may be arranged at the periphery of the touch input part Aa such as on a lower side thereof, upper and lower sides thereof, a left side thereof, or a right side thereof.

Figure 3A:
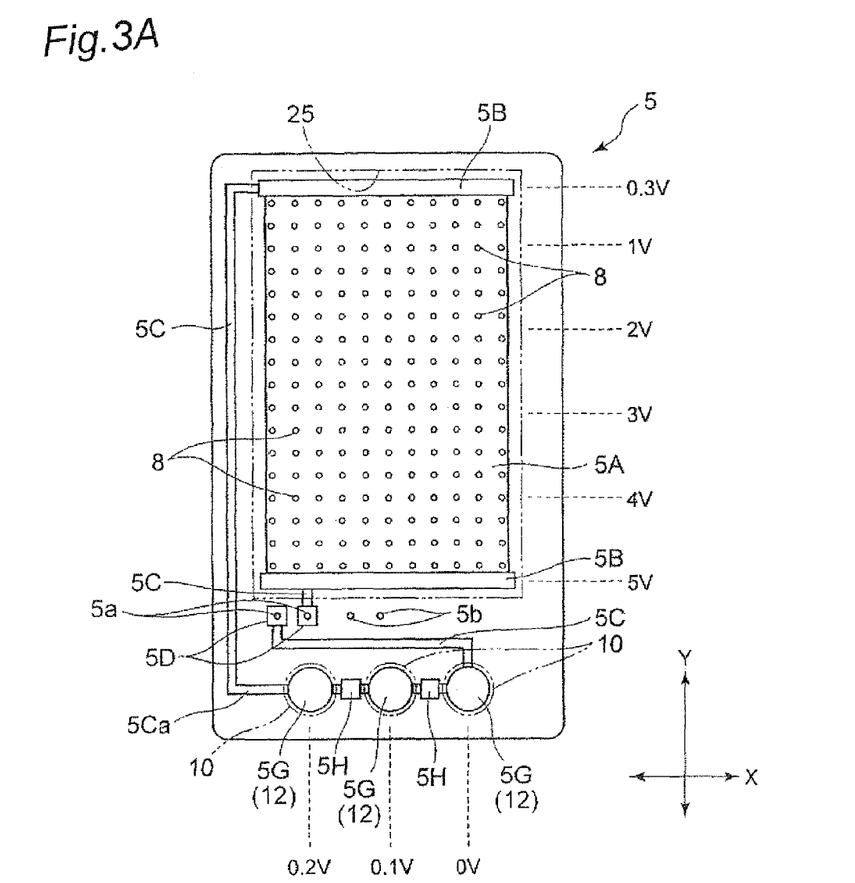
FIG. 3A is a front view of a rear face side substrate of the protective panel in the first embodiment.
Figure 3B:
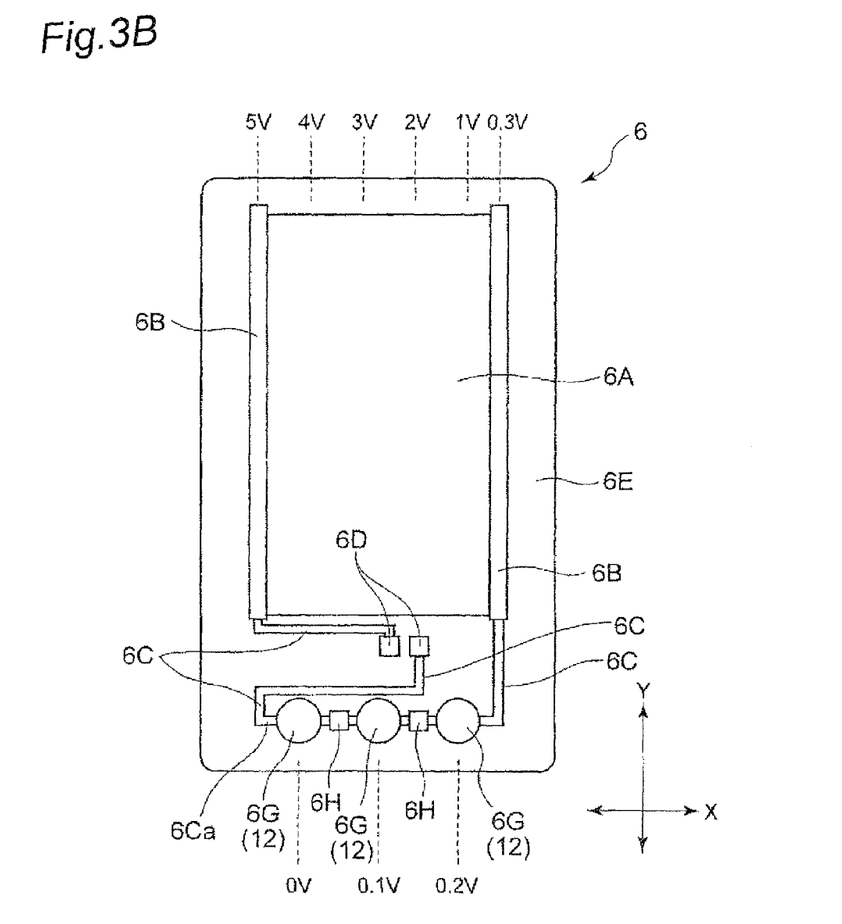
FIG. 3B is a rear view of a front face side substrate of the protective panel in the first embodiment.

As shown in FIGS. 2 to 3B, the protective panel A has a rear face side substrate 5, and a front face side substrate 6.

The front face side substrate 6 has a rectangular resistive film 6A which serves as one example of a touch-input-part upper transparent electrode and is formed on its rear surface side, and functions as one example of an upper (transparent) electrode base material. The rear face side substrate 5 has a rectangular resistive film 5A which serves as one example of a touch-input-part lower transparent electrode and is formed on its front surface side, and functions as one example of a lower (transparent) electrode base material. The resistive films 5A and 6A of the rear face side substrate 5 and the front face side substrate 6 are oppositely arranged with a predetermined space with a plurality of fine dot-shaped spacers 8 interposed therebetween so as to have an air layer as will be described below. Thus, a region in which the rectangular resistive films 5A and 6A are opposed functions as the touch input part Aa in the protective panel A.

As shown in FIGS. 2 to 3A, the rear face side substrate 5 is a resin plate superior in transparency, rigidity, and processability, such as a polycarbonate resin (PC), methacryl resin (PMMA), acrylonitrile-styrene copolymer resin (AS), acrylonitrile-butadiene-styrene copolymer resin (ABS), cellulose propionate resin (CP), polystyrene resin (PS), polyester resin, or polyethylene resin (PE). Especially, as the rear face side substrate 5, it is preferable to use the polycarbonate resin (PC) or methacrylate resin (PMMA) which is superior in transparency. A thickness of the resin plate of the rear face side substrate 5 may be selected from a range of 0.5 to 3.0 mm, and 0.8 to 1.1 mm is especially preferable.

In addition, the rear face side substrate 5 may be a glass plate superior in strength and transmissivity, such as soda glass, borosilicate glass, or hardened glass. When the glass plate superior in strength is employed as the rear face side substrate 5, the protective panel A can be thinned by thinning the thickness of the rear face side substrate 5, and the mobile telephone 1 can be thin due to having the thin protective panel A. A thickness of the glass plate may be selected from a range of 0.2 to 3.0 mm, and 0.55 to 1.0 mm is especially preferable.

Figure 4:
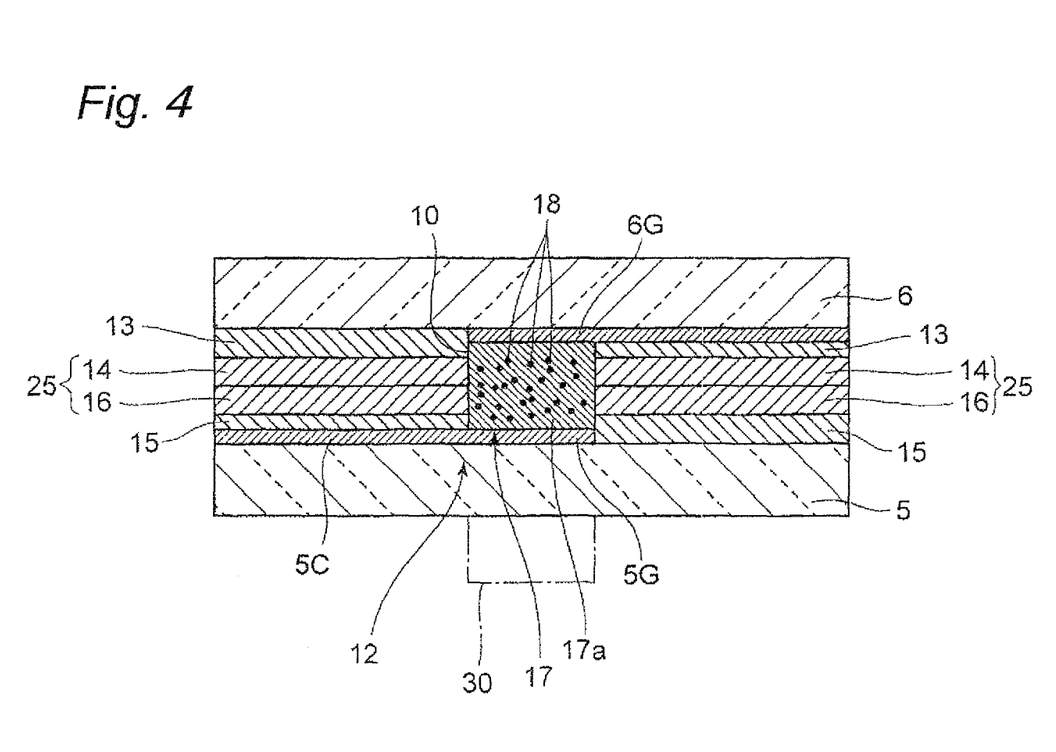
FIG. 4 is an enlarged cross-sectional view of a switch of the protective panel in the first embodiment.

In addition to the resistive film 5A, the front surface side of the rear face side substrate 5 includes a pair of parallel bus bars 5B positioned on opposite sides of a Y-axis direction of the resistive film 5A, a pair of routing circuits 5C positioned at the periphery of the resistive film 5A, a pair of electrodes 5D positioned in regions having corresponding through holes 5a, and a pair of terminal electrodes 5G functioning as one example of a peripheral-switch lower electrode. A frame-shaped bonding layer 25 may be arranged in a peripheral edge part, on the front surface side of the rear face side substrate 5, for example, but instead of that, the frame-shaped bonding layer 25 may be arranged in a peripheral edge part on the rear surface side of the front face side substrate 5, or the frame-shaped bonding layer 25 may be formed in each of the peripheral edge part on the front surface side of the rear face side substrate 5 and the peripheral edge part on the rear surface side of the front face side substrate 5. Note that, FIG. 4 shows a case where insulating bonding layers 16 and 14 are arranged in the peripheral part on the front surface side of the rear face side substrate 5 and the peripheral part on the rear surface side of the front face side substrate 6, respectively, to form the bonding layer 25. In FIG. 4, reference numerals 13 and 15 represent an insulating resist formed on the front surface side of the rear face side substrate 5 and an insulating resist formed on the rear surface side of the front face side substrate 6, respectively. The bonding layers 16 and 14 are formed on the resists 13 and 15, respectively.

In addition, a wiring of the peripheral switch 12 may be shared with a transparent electrode and a wiring of the touch input part Aa, or may be independent from the transparent electrode of the touch input part Aa.

Instead of directly forming the resistive film 5A and the like on the rear face side substrate 5, there is a following method. For example, other than the rear face side substrate 5, a transparent insulating film may be prepared, and on a front surface side of the transparent insulating film, the resistive film 5A, the pair of bus bars 5B, the pair of routing circuits 5C, the pair of electrodes 5D, the pair of terminal electrodes 5G, and the frame-shaped bonding layer 25 may be formed. Then, a rear surface of the transparent insulating film is bonded onto the front surface of the rear face side substrate 5, so that on the front surface side of the rear face side substrate 5, the resistive film 5A, the pair of bus bars 5b, the pair of routing circuits 5C, the pair of electrodes 5D, the pair of terminal electrodes 5G, and the frame-shaped bonding layer 25 may be formed.

When the transparent insulating film is used as described above, the transparent insulating film may be an engineering plastic film including polycarbonate series, polyamide series, or polyether ketone series; or a resin film including acrylic series, polyethylene terephthalate series, or polybutylene terephthalate series.

As shown in FIGS. 2 to 3B, the front face side substrate 6 is formed of a flexible transparent insulating film which has a property of being dented when pressed by a finger. The flexible transparent insulating film may be an engineering plastic film including polycarbonate series, polyamide series, or polyether ketone series; or a resin film including acrylic series, polyethylene terephthalate series, or polybutylene terephthalate series. A thickness of the front face side substrate 6 may be 100 µm as one example.

In addition to the resistive film 6A, the rear surface side of the front face side substrate 6 includes a pair of parallel bus bars 6B positioned on opposite sides of an X-axis direction of the resistive film 6A, a pair of routing circuits 6C located at the periphery of the resistive film 6A, a pair of electrodes 6D opposed to the corresponding through holes 5b, and a pair of terminal electrodes 6G functioning as one example of a peripheral-switch upper electrode.

As shown in FIGS. 2 to 3B, each of the resistive films 5A and 6A is a metal oxide film including a tin oxide, indium oxide, antimony oxide, zinc oxide, cadmium oxide, or indium tin oxide (ITO); a composite film mainly containing these metal oxides; or a transparent conductive film including a metal film containing gold, silver, copper, tin, nickel, aluminum, or palladium. Note that, each of the resistive films 5A and 6A may be a multiple-layer having two or more layers. Each of the resistive films 5A and 6A is formed by a vacuum deposition method, sputtering method, ion plating method, CVD method, or the like.

On the surface of the resistive film 5A or 6A, the plurality of fine dot-shaped spacers 8 can be formed in order to prevent an erroneous contact when the resistive films 5A and 6A are opposed. Here, as one example, the plurality of spacers 8 are formed on the resistive film 5A of the rear face side substrate 5.

The spacer 8 may include a transparent light curing resin including epoxy acrylate series or urethane acrylate series; or a transparent heat curing resin including polyester series or epoxy series. In addition, the spacer 8 is formed by a printing method such as screen printing; or a photo process.

Each of the bus bars 5B and GB, the routing circuits 5C and 6C, and the electrodes 5D and 6D is formed of a metal such as gold, silver, copper, or nickel; or a paste having conductivity such as carbon. Each of the bus bars 5B and 6B, the routing circuits 5C and 6C, and the electrodes 5D and 6D is formed by a printing method such as screen printing, off-set printing, gravure printing, or flexographic printing; a photoresist method; or a brush painting method.

In general, the bus bar 5B and 6B are formed at parts closer to end parts of the rear face side substrate 5 and the front face side substrate 6, respectively, so that areas in which the bus bars 5B and 6B are not formed are provided as large as possible in center parts of the rear face side substrate 5 and the front face side substrate 6. A largeness and a shape of the area in which the bus bars 5B or 6B is not formed, that is, an input area (in which the touch input part Aa can be formed) or a display area can be variously changed depending on a largeness and a shape of an input area or a display area in an electronic device B such as the mobile telephone 1.

As shown in FIGS. 3A and 3B, according to the pair of routing circuits 5C and 6C formed on the rear face side substrate 5 and the front face side substrate 6, respectively, one routing circuit 5C (6C) is formed to pass through a shortest path between the corresponding bus bar 5B (6B) and the corresponding electrode 5D (6D). The other routing circuit 5C (60) is formed so as to have a circuit part 5Ca (6Ca) provided along a lower edge of the rear face side substrate 5 (front face side substrate 6). In the circuit part 5Ca (6Ca), three terminal electrodes 5G (6G) and two resistors 5H (6H) are arranged with a predetermined space such that the resistors 5H (6H) are positioned between the adjacent terminal electrodes 5G (6G).

That is, the rear face side substrate 5 and the front face side substrate 6 have three terminal electrodes 5G and 6G connected in series through the corresponding routing circuits 5C and 6C so as to provide potential differences in the resistive films 5A and 6A, respectively. The terminal electrodes 5G and 6G correspond to one example of the peripheral-switch lower electrode and one example of the peripheral-switch upper electrode of the peripheral switch 12, respectively. That is, when the rear face side substrate 5 and the front face side substrate 6 are connected, the terminal electrodes 5G and 6G are arranged to be opposed with a predetermined space.

The bonding layer 25 arranged between the rear face side substrate 5 and the front face side substrate 6 has a through hole 10 to house a peripheral-switch pressure sensitive member 17 serving as one example of a pressure sensitive conductive member to allow the opposed terminal electrodes 5G and 6G to be connected. That is, as shown in FIG. 4, the through hole 10 is formed in a lower peripheral part of the peripheral part of the touch input part Aa in FIG. 3A so as to be arranged between the front surface of the rear face side substrate 5 and the rear surface of the front face side substrate 6 and penetrate the frame-shaped bonding layer 25. By printing pressure sensitive conductive ink in the through hole 10, the peripheral-switch pressure sensitive member 17 can be arranged in the through hole 10. Thus, the one peripheral switch 12 is provided in a position of the through hole 10. In this example, the three through holes 10, that is, peripheral switches 12 are linearly aligned with a predetermined space in right and left directions.

That is, the opposed terminal electrodes 5G and 6G constitute the peripheral switch 12 to detect whether or not the contact point terminal electrodes 5G and 6G are connected when a voltage is applied to one electrode 5D (6D) of the rear face side substrate 5 and the front face side substrate 6, based on the voltage detected by the other electrode 6D (5D).

A material and a formation method of the terminal electrodes 5G and 6G are similar to the resistive films 5A and 6A, so that when the terminal electrodes 5G and 6G. are formed at the same time as the resistive films 5A and 6A, it is not necessary to especially provide a step of forming the terminal electrodes 5G and 6G. Thus, each of the terminal electrodes 5G and 6G is formed of a transparent conductive film as a transparent electrode, for example. As one example, each of the terminal electrodes 5G and 6G has a thickness of 1 to 100 μm when an ITO film is used, and 1 to 40 μm when printing ink is used, and as for each of the lower transparent electrode 5A and the upper transparent electrode 6A, a thickness of the ITO film is 1 to 100 μm.

As for the through hole 10, the terminal electrode 5G of the rear face side substrate 5 and the terminal electrode 6G of the front face side substrate 6 are exposed to a lower end and an upper end of the through hole 10, respectively, and the insulating peripheral-switch pressure sensitive member 17 is housed in the through hole 10, so that a lower end of the peripheral-switch pressure sensitive member 17 is in contact with the terminal electrode 5G, and an upper end of the peripheral-switch pressure sensitive member 17 is in contact with the terminal electrode 6G, whereby the peripheral switch 12 is provided. The peripheral-switch pressure sensitive member has dispersed conductive particles 18 as will be described below. Thus, when a portion on a side of a hard coat layer 9 is pressed with a finger, a pressed force is transmitted to the peripheral-switch pressure sensitive member 17 through the hard coat layer 9, a design sheet 7, and the terminal electrode 6G on the front face side substrate 6, and the terminal electrode 6G on the front face side substrate 6 is electrically connected to the terminal electrode 5G on the rear face side substrate 5.

As one specific example, as shown in FIG. 4, around the through hole 10, the lower resist 15 is arranged on the terminal electrode 5G on the rear face side substrate 5 except for an end part that is exposed in the through hole 10, and a lower bonding and fixing glue 16 is arranged on the lower resist 15. Similarly, the upper resist 13 is arranged under the terminal electrode 6G of the front face side substrate 6 except for an end part that is exposed in the through hole 10, and an upper bonding and fixing glue 14 is arranged under the upper resist 13. The lower bonding and fixing glue 16 and the upper bonding and fixing glue 14 are integrally banded to each other. It is preferable that each of the lower resist 15, the lower bonding and fixing glue 16, the upper resist 13, and the upper bonding and fixing glue 14 has an insulating property. These resists and glues may be arranged by printing formation.

Hereinafter, a structure of the peripheral switch 12 will be described in detail.

The peripheral-switch pressure sensitive member 17 contains the many electrically conductive particles 18 dispersed in an insulating base material part 17a.

For example, the base material part 17a of the peripheral-switch pressure sensitive member 17 has a thickness of several tens of micrometers (such as 40 μm to 80 μm), and the base material part 17*a* is preferably formed by screen printing. In addition, the peripheral-switch pressure sensitive member 17 preferably has a thickness of 1 μm or more from a producible standpoint.

The conductive particle 18 only needs to be not deformed itself, have conductivity to carry an electric current, and expect a quantum tunneling effect as will be described below, and its particle diameter only has to be appropriate for the printing. For example, in the case of screen printing, the particle diameter only has to be able to pass through a mesh without resistance. A specific material example of the conductive particle 18 includes QTC as will be described below. The conductive particles 18 are dispersed in the base material part 17*a* to the extent that a current can be carried without affecting visibility.

According to the peripheral-switch pressure sensitive member 17 as one example, when a pressure is applied, a tunnel current flows between the adjacent conductive particles 18 among the many conductive particles contained in the peripheral-switch pressure sensitive member 17 regardless of whether or not the adjacent conductive particles 18 are directly in connect with each other, and the peripheral-switch pressure sensitive member 17 changes from an insulating state to a current-carrying state. One example of a composition of the peripheral-switch pressure sensitive member 17 includes a quantum tunneling composite available as a product name of "QTC" from PERATECH LTD in Darlington in England. Here, the tunnel current means a current which flows when an electron leaks up out of the conductive particle 18 because an existence probability density of the electron is not zero in the conductive particles 18 in a case where the conductive particles 18 are not directly in contact with each other but the conductive particles 18 are very close to each other in the order of nanometer, which is a phenomenon explained as the tunneling effect in quantum mechanics.

More specifically, when a force is applied from a finger, pen, or the like to a surface of the hard coat layer 9 (such as an upper surface of the hard coat layer 9 shown in FIG. 2), the applied force is transmitted so as to penetrate the hard coat layer 9, the design sheet 7, the front face side substrate 6, and the terminal electrode 6G in a thickness direction thereof and reaches the peripheral-switch pressure sensitive member 17. Then, the tunneling effect is generated among the plural conductive particles 18 in the peripheral-switch pressure sensitive member 17, and the tunnel current flows among the plural conductive particles 18, so that the upper terminal electrode 6G and the lower terminal electrode 5G are electrically connected, whereby the pressed force is detected as an ON action of the peripheral switch 12, or in some cases, a change of the pressed force applied in the thickness direction of the peripheral switch 12 (Z direction) is detected as a change in resistance value (converted to a change in voltage), so that strength of the pressed force to the peripheral switch 12 can be detected.

The through hole 10 preferably has a direction of 1.0 mm or more. When the through hole 10 has a direction smaller than 1.0 mm, the through hole 10 cannot serve as the switch, and an upper limit value of the diameter of the through hole 10 is set to the extent that the through hole 10 can be arranged in the panel and its shape is to be freely designed.

Note that, although not shown specifically, the rear side casing part 2B has four spring connector pins (not shown) at positions opposed to the through holes 5*a* and 5*b* of the rear face side substrate 5. Each spring connector pin is electrically connected to an interface (not shown) of the display device 3.

The electrodes 5D and 6D of the rear face side substrate 5 and the front face side substrate 6 are electrically connected to the corresponding spring connector pins, using the through holes 5*a* and 5*b* of the rear face side substrate 5.

A conductive bonding agent (not shown) formed of a conductive paste is poured into each of the through holes 5*a* and 5*b*, so as to be electrically in contact with the corresponding electrodes 5D and 6D, and a conductive pin (not shown) having a pinhead is inserted such that its one end can be electrically in contact with the conductive bonding agent, so that a touch input signal from the resistive films 5A and 6A can be taken out on the rear side of the front side casing part 2A. Thus, when the front side casing part 2A and the rear side casing part 2B are connected, each of the electrode 5D of the rear face side substrate 5 and the electrode 6D of the front face side substrate 6 functions as a planar terminal to connect to the corresponding spring connector pin through the conductive pin. Thus, the touch input signal from each of the resistive films 5A and 6A can be inputted to the display device 3.

In addition, the design sheet 7 functioning as one example of a decorative sheet is attached on the front surface side of the front face side substrate 6.

As shown in FIGS. 1 and 2, the design sheet 7 may be an engineering plastic film including polycarbonate series, polyamide series, or polyether ketone series; or a transparent film including acrylic series, polyethylene terephthalate series, or polybutylene terephthalate series. A thickness of the transparent film may be selected from a range of 25 to 200 μm.

The hard coat layer 9 is formed on a front surface side of the design sheet 7, to protect the design sheet 7.

A material used for the hard coat layer 9 includes an inorganic material such as a siloxane series resin; or an organic material such as an acrylic epoxy series or urethane series heat curing resin, or acrylate series light curing resin. A thickness of the hard coat layer 9 is preferably 1 to 7 μm. The hard coat layer 9 may be formed by a coating method such as roll coating or spray coating; or a normal printing method such as screen printing, off-set printing, gravure printing, or flexographic printing.

The design sheet 7 may be a transparent sheet including a decorative layer 7B and a bonding layer 7C directly formed on a rear surface side, and the hard coat layer 9 may be directly formed on a front surface side of the design sheet 7. In addition, the design sheet 7 may be the transparent sheet including the decorative layer 7B and the bonding layer 7C directly formed on the rear surface side, the hard coat layer 9 may be formed on a transparent sheet different from the above transparent sheet, and these transparent sheets may be attached to each other.

The design sheet 7 is formed of the decorative layer 7B and the bonding layer 7C as one example, The design sheet 7 such as the transparent sheet or the hard coat layer 9 may be embossed, or a non-glare treatment may be performed by mixing fine particles such as silica or alumina serving as a body pigment in the hard coat layer 9 to prevent light reflection.

The decorative layer 7B is formed so as to have a rectangular transparent part 7*a* in its center and have a frame-shaped decorative part 7*b* in its periphery. A largeness or shape of the transparent part 7*a* can be variously changed depending on a largeness or shape of the input area or the display area in which the bus bars 5B and 6B and the routing circuits 5C and 6C are not formed in the rear face side substrate 5 and the front face side substrate 6, that is, a largeness or a shape of the input area or the display area in the electronic device B such as the mobile telephone 1.

The peripheral switch 12 is covered with the decorative part 7*b*, and a desired picture can be arranged in a part corresponding to the peripheral switch 12. For example, when the peripheral switch 12 is the ON/OFF switch to make a call on the mobile telephone, a telephone mark may be arranged in the part corresponding to the peripheral switch 12. In addition, when the peripheral switch 12 is the ON/OFF switch to listen to music, a musical note mark may be arranged in the part corresponding to the peripheral switch 12.

By forming the decorative layer 7B as described above, a peripheral part 6E of the front face side substrate 6 is provided with a decoration to cover over the bus bars 5B and 6B of the rear face side substrate 5 and the front face side substrate 6 etc. Thus, it is not necessary to form a frame part in the display window 2A of the casing 2 to cover over the bus bars 5B and 6B of the rear face side substrate 5 and the front face side substrate 6 etc., so that the mobile telephone 1 can be thinned.

The decorative layer 7B may be formed of colored ink containing a pigment or dye having an appropriate color, as a coloring agent using a binder including a polyvinyl series resin, polyamide series resin, polyester series resin, polyacrylic series resin, polyurethane series resin, polyvinyl acetal series resin, polyester urethane series resin, or alkyd resin.

The decorative layer 7B is preferably formed by the normal printing method such as screen sprinting, off-set printing, gravure printing, or flexographic printing. Especially, the off-set printing method or the gravure printing method is suitable when polychrome or graduation expression is made.

The decorative layer 7B may be formed of a metal thin film layer, or a combination of a picture printed layer and the metal thin film layer. The metal thin film layer expresses a metallic luster as the decorative layer 7B, and is formed by a vacuum deposition method, sputtering method, ion plating method, or plating method. In this case, according to the metallic luster to be expressed, a metal such as aluminum, nickel, gold, platinum, chrome iron, copper, tin, indium, silver, titanium, lead, or zinc; or an alloy or a compound of the above metals is used. A film thickness of the metal thin film layer is about 0.05 μm in general. In addition, when the metal thin film layer is provided, a pre-anchor layer or a post-anchor layer may be provided in order to improve adhesiveness with another layer.

The bonding layer 7C may be appropriately formed of a heat sensitive or pressure sensitive resin which is suitable for the front face side substrate 6 and the design sheet 7. For example, a polyacrylic series resin, polystyrene series resin, or polyamide series resin may be used in a case where the front face side substrate 6 and the design sheet 7 are formed of polycarbonate series or polyamide series. In addition, vinyl chloride, vinyl acetate, or acrylic series copolymer may be used in a case where the front face side substrate 6 and the design sheet are formed of acrylic series or polyethylene terephthalate series.

The bonding layer 7C is formed by the normal printing method such as screen sprinting, off-set printing, gravure printing, or flexographic printing.

The front face side substrate 6 may not have the design sheet 7. When the design sheet 7 is not provided, the hard coat layer 9 may be formed or arranged on the front surface side of the front face side substrate 6. In a case where the non-glare treatment is performed when the design sheet 7 is not provided, there is a method in which the front surface side of the front face side substrate 6 or the hard coat layer 9 is embossed, or fine particles such as silica or alumina serving as a body pigment are mixed in the hard coat layer 9.

According to the configuration of the first embodiment, the following effects can be provided.

First, since the peripheral-switch pressure sensitive member 17 serving as one example of the pressure sensitive conductive member is arranged in the through hole 10 provided between the front face side substrate 6 and the rear face side substrate 5, and a volume in the through hole 10 does not significantly change when the peripheral switch 12 is pressed, so that the peripheral switch 12 of the front face side substrate 6 does not significantly get dented with age, and appearance deterioration can be prevented. In addition, deterioration due to repeated use can be prevented, and a large dent is not formed, so that there is no problem in flatness.

In addition, since the peripheral switch 12 is configured such that the contact points are not brought into contact with each other, the peripheral switch 12 can detect not only the ON/OFF, but also the strength (change) of the pressed force. For example, when the peripheral switch 12 is used as a cursor key, the peripheral switch 12 can have a function such that a moving speed of a cursor becomes high based on the strength of the pressed force to the peripheral switch 12 when the peripheral switch 12 is pressed.

In addition, since the electrode of the front face side substrate 6 and the electrode of the rear face side substrate 5 are electrically connected by the peripheral-switch pressure sensitive member 17, it is not necessary to connect the contact points at the time of inputting, and the contact point is not largely curved, so that there is no problem in durability of the contact point.

Furthermore, as described above, the peripheral-switch pressure sensitive member 17 is arranged, and it is not necessary to largely press down the front face side substrate 6 into the through hole 10 until the contact points are brought into contact with each other, so that the switch input can be performed with a small pressed force. Meanwhile, in the conventional case, since it is necessary to largely press down the front face side substrate into the opening until the contact points are brought into contact with each other, the problem is that the switch input cannot be surely performed with a small pressed force.

In addition, since it is not necessary to largely press down the front face side substrate 6 into the through hole 10 until the contact points are brought into contact with each other, a large opening size to largely deform the front face side substrate 6 is not needed. Therefore, the switch size can be smaller, and the space is saved. For example, while at least about 8 mm is needed as a diameter of the ON/OFF switch in the conventional case, the diameter can be reduced to about 2 mm or less in this embodiment.

In addition, since it is not necessary to largely press down the front face side substrate 6 into the through hole 10 until the contact points are brought into contact with each other, an opening shape of the through hole 10 is not limited to a shape which is suitable for largely deforming the front face side substrate 6. Therefore, a degree of freedom of the design of the switch can be increased. Meanwhile, in the conventional case, since it is necessary to largely press down the front face side substrate into the opening until the contact points are brought into contact with each other, the shape is limited to the opening shape which is suitable for largely deforming the front face side substrate, such as a circle.

In addition, since it is not necessary to largely press down the front face side substrate 6 into the through hole 10 until the contact points are brought into contact with each other, the size of the switch can be smaller than a fingertip. For example, when the several switches 12 each having a pressure sensitive conductive part smaller than the fingertip are aligned, a precise input can be performed by pressure sensitive conductive operations of the several small switches 12, based on fine movement of the fingertip.

Second Embodiment

Figure 5A:
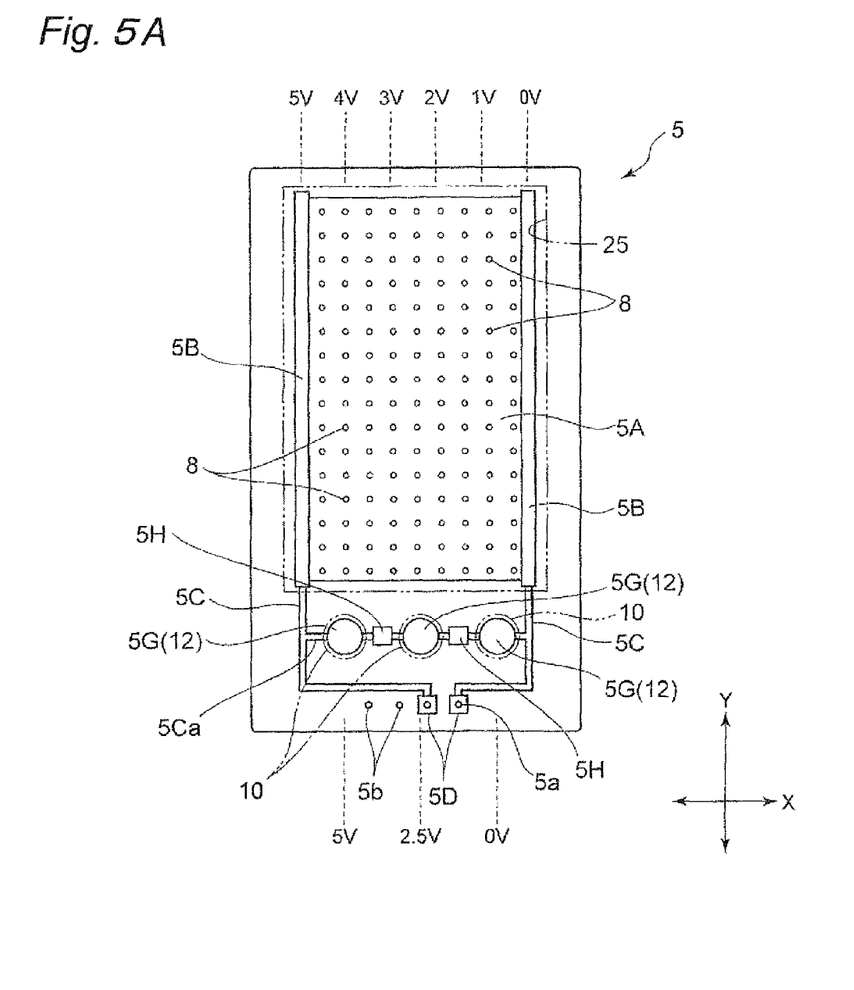
FIG. 5A is a front view of a protective panel according to a second embodiment of the present invention.
Figure 5B:
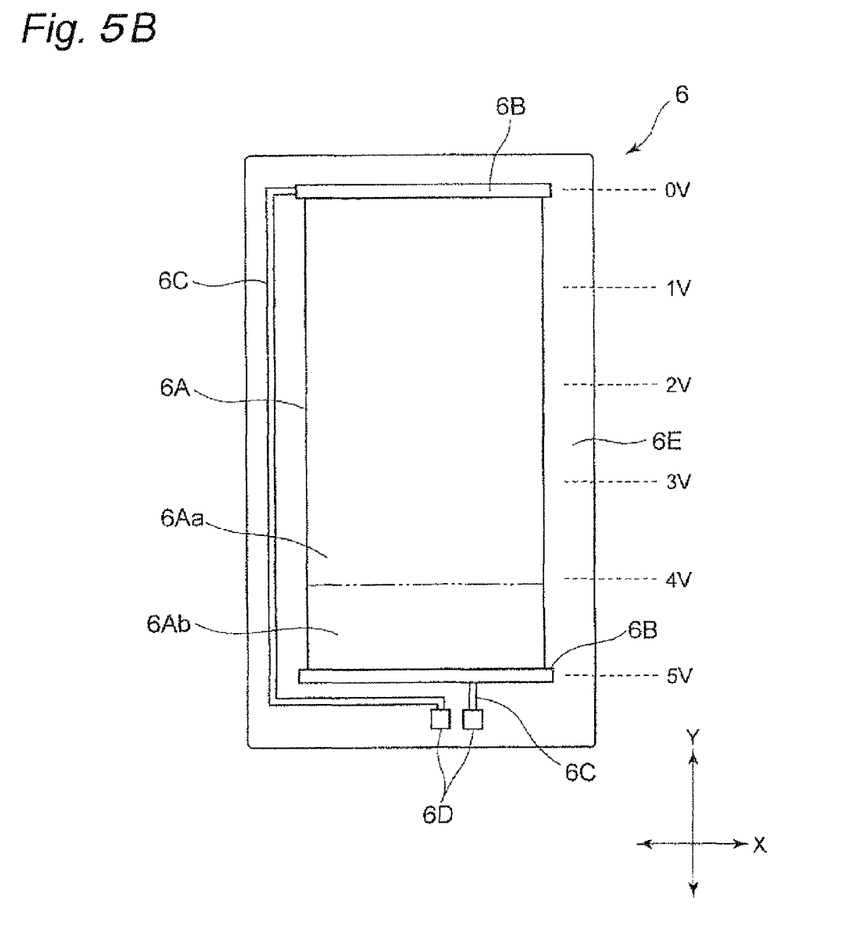
FIG. 5B is an exploded view of the protective panel according to the second embodiment of the present invention.

In addition to the peripheral switch 12 including the terminal electrodes 5G and 6G connected to the pair of bus bars 5B and 6B in series with the transparent resistive films 5A and 6A through the routing circuits 5C and 6C, respectively as described in the first embodiment, the peripheral switch 12 may include a terminal electrode 5Ga connected to a pair of bus bars 5Ba in parallel with the transparent resistive film through the routing circuit as shown in FIGS. 5A and 5B. Hereinafter, this will be described as a protective panel according to a second embodiment of the present invention.

FIGS. 5A and 5B are a front view of a rear face side substrate 5 and a rear view of a front face side substrate 6 of the protective panel according to the second embodiment, respectively.

As shown in FIG. 5B, in the front face side substrate 6, the transparent resistive film 6A is formed to have an enlarged region 6Ab adjacent to a lower side of a region 6Aa opposed to the transparent resistive film 5A, by enlarging a distance between a pair of bus bars 6B toward the lower side. Thus, the routing circuits 6C for the pair of terminal electrodes 6G in the front face side substrate 6 are formed so as to pass through shortest paths from the pair of bus bars 6B.

As shown in FIG. 5A, in the rear face side substrate 5, the three terminal electrodes 5G and the two resistors 5H are formed in a part opposed to the enlarged region 6Ab, with a predetermined space in the X axis direction such that the resistor 5H is positioned between the adjacent terminal electrodes 5G. Thus, the routing circuits 5C for the pair of terminal electrodes 5G in the rear face side substrate 5 are formed so as to have the circuit part 5Ca so that the transparent resistive film 5A is in parallel with the three terminal electrodes 5G and the two resistors 5H.

Each terminal electrode 5G is arranged so as to be opposed to the enlarge region 6Ab with a predetermined space when the rear face side substrate 5 and the front face side substrate 6 are connected. The bonding layer 25 of the rear face side substrate 5 is formed to have the through hole 10 to allow a contact between the opposed terminal electrode 5G and enlarged region 6Ab of the transparent resistive film 6A. That is, here, a part of the enlarged region 6Ab exposed to the through hole 10 functions as the terminal electrode.

That is, the opposed terminal electrode 5G and the enlarged region 6Ab of the transparent resistive film 6A constitute the peripheral switch 12 to detect whether or not the terminal electrode 5Ga is in contact with the enlarge region 6Ab when a voltage is applied to one terminal electrode 5G (6Ab) of the rear face side substrate and the front face side substrate 6, based on a voltage detected by the other terminal 6Ab (5G).

The second embodiment can provide the same operation effect as the first embodiment.

Other Embodiments

In addition, the present invention is not limited to the first and second embodiments, and can be applied to various kinds of embodiments.

In the above embodiment, the pressure sensitive conductive member is arranged so as to be in contact with the peripheral-switch upper electrode and the peripheral-switch lower electrode, but the present invention is not limited thereto.

Figure 6A:
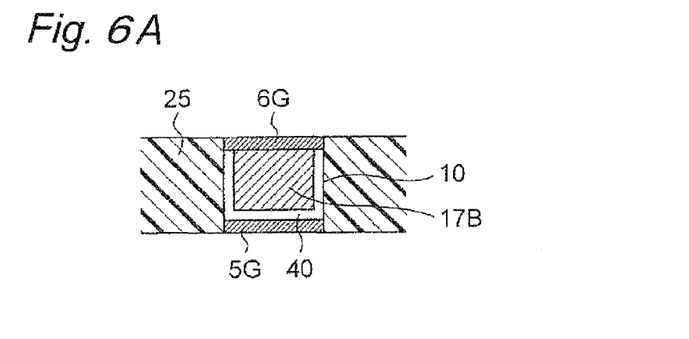
FIG. 6A is an enlarged cross-sectional view of a switch of the protective panel according to a modification of the first embodiment of the present invention.
Figure 6B:
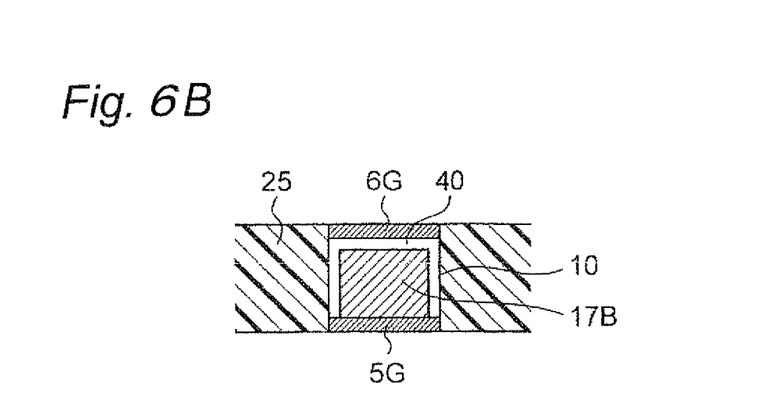
FIG. 6B is an enlarged cross-sectional view of a switch of the protective panel according to a modification of the first embodiment of the present invention.

For example, according to the above configuration, the switch is too sensitive as the pressure sensitive switch, so that as a configuration to alleviate this, as shown in FIGS. 6A and 6B, a peripheral switch pressure sensitive conductive layer 17B serving as one example of the pressure sensitive conductive member is formed on one electrode of the pair of terminal electrodes 6G functioning as one example of the peripheral-switch upper electrode, or the pair of terminal electrodes 5G functioning as one example of the peripheral-switch lower electrode, and a slight gap (sensitivity adjusting gap) 40 is provided between the peripheral switch pressure sensitive conductive layer 17B and the other electrode to dull the sensitivity. According to this configuration, the switch is pressed until the gap 40 is eliminated, and the electrode 6G or 5G and the pressure sensitive conductive layer 17B which were opposed across the gap 40 are brought into contact with each other and electrically connected, so that the terminal electrodes 5G and 6G are electrically connected because a current flows in the pressure sensitive conductive layer 17B. In this case, since the terminal electrodes 5G and 6G are not electrically connected when the pressed force cannot eliminate the gap 40, the sensitivity can be adjusted by a distance of the gap 40. The gap 40 may be provided between the pressure sensitive conductive layer 17B and the terminal electrode 6G, or the gap 40 may be provided between the pressure sensitive conductive layer 17B and the terminal electrode 5G. Here, the distance of the gap 40 (gap 41 and 42) is up to about half of a depth of the through hole, such as when the depth of the through hole is 40 μm to 80 μm, the height is preferably half of the depth, that is, 20 μm to 40 μm.

Figure 6C:
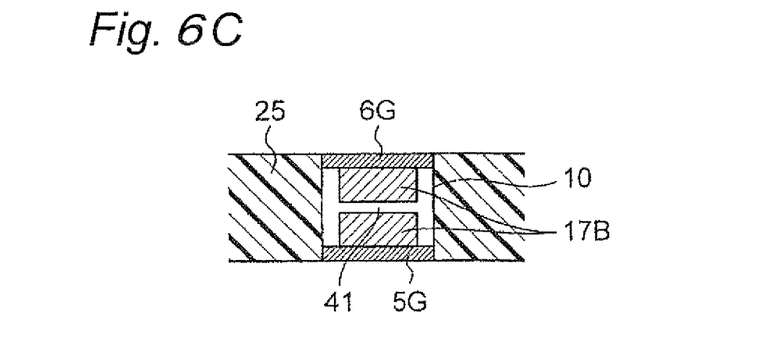
FIG. 6C is an enlarged cross-sectional view of a switch of the protective panel according to a modification of the first embodiment of the present invention.

As another configuration, as shown in FIG. 6C, the pressure sensitive conductive layer 17B is formed on each of the peripheral switch upper terminal electrode 6G and the peripheral switch lower terminal electrode 5G, and a slight gap (sensitivity adjusting gap) 41 is provided in a middle of the pressure sensitive conductive layer 17B to dull the sensitivity. According to this configuration, the switch is pressed until the gap 41 is eliminated, and the pressure sensitive conductive layers 17B which were opposed across the gap 41 are brought into contact with each other and electrically connected, so that the terminal electrodes 5G and 6G are electrically connected because a current flows in the pressure sensitive conductive layer 17B. In this case, since the terminal electrodes 5G and 6G are not electrically connected when the pressed force cannot eliminate the gap 41, the sensitivity can be adjusted by a distance of the gap 41. That is, according to this configuration, the gap 41 is formed in a middle point between the electrodes 5G and 6G. In addition, in this case, a thickness of the pressure sensitive conductive layer 17B can be small, so that the pressure sensitive conductive layer 17B can be easily formed even when the pressure sensitive conductive layer 17B is the ink coating film.

Figure 6D:
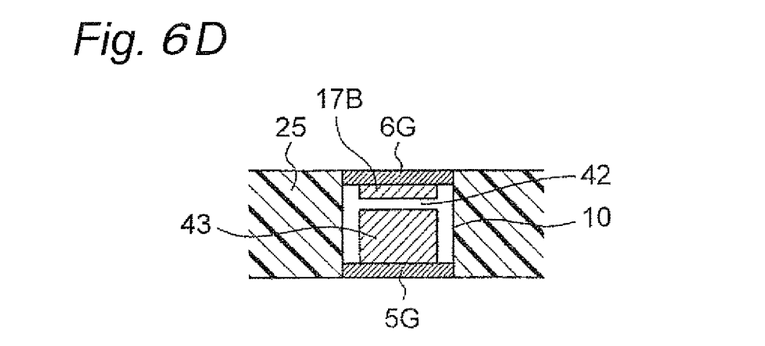
FIG. 6D is an enlarged cross-sectional view of a switch of the protective panel according to a modification of the first embodiment of the present invention.

As another configuration, as shown in FIG. 6D, another modification when the gap is formed in the middle point between the electrodes is illustrated. The pressure sensitive conductive layer 17B serving as one example of the pressure sensitive conductive member is formed on one electrode of the peripheral switch upper terminal electrodes 6G or the peripheral switch lower terminal electrodes 5G, and a conductive layer 43 serving as one example of a conductive member which is not pressure sensitive is formed on the other electrode, a slight gap (sensitivity adjusting gap) 42 is provided between the pressure sensitive conductive layer 17B serving as one example of the pressure sensitive conductive member, and the conductive layer 43 serving as one example of the conductive member which is not pressure sensitive, to dull the sensitivity. According to this configuration, the switch is pressed until the gap 42 is eliminated, and the pressure sensitive conductive layer 17B and the conductive layer 43 which were opposed across the gap 42 are brought into contact with each other and electrically connected, so that the terminal electrodes 5G and 6G are electrically connected because a current flows in the pressure sensitive conductive layer 17B and the conductive layer 43. In this case, since the terminal electrodes 5G and 6G are not electrically connected when the pressed force cannot eliminate the gap 42, the sensitivity can be adjusted by a distance of the gap 42. The example of the conductive member which is not pressure sensitive includes a carbon paste, Cu paste, Ag paste, or Cu—Ag mixed paste.

In addition, the terminal electrode of the peripheral switch 12 may be configured by a circuit, that is, a totally different circuit in which the pair of bus bars and the terminal electrode 5G are not connected.

For example, when needed, a conductive primer layer may be interposed between the peripheral-switch pressure sensitive member 17 and another layer such as the peripheral-switch terminal electrode in order to further improve the adhesiveness.

The peripheral-switch pressure sensitive member 17 may be formed of a plurality of layers instead of a single layer.

When each of the terminal electrodes 5G and 6G is a transparent conductive electrode having translucency, and the peripheral-switch pressure sensitive member 17 is transparent, and a surface design and the substrate transmit light, or when a light transmitting through hole is further formed in the peripheral-switch pressure sensitive member 17 (when pressure sensitive ink of the peripheral-switch pressure sensitive member 17 is arranged in annular shape or a frame shape), a light source (see reference numeral 30 in FIG. 4) such as an LED is arranged on the rear surface side, and the light source such as the LED is turned on when the switch is ON, so that a switch ON state can be clearly exhibited by the switch 12.

In addition, as for the pressure sensitive conductive member, in addition to the case where the pressure sensitive conductive ink is printed as described in the above embodiment, it may be formed by arranging a pressure sensitive conductive rubber, or another piezoelectric element in the through hole 10.

In addition, by appropriately combining arbitrary embodiment or modification among the above-descried various embodiments and modifications, the effect thereof can be combined.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

According to the protective panel and the electronic device according to the present invention, the part of the peripheral switch of the upper electrode base material does not largely get dented with age, and appearance deterioration can be prevented, so that they can be applied to a mobile telephone, smartphone, PDA, portable music player (such as portable MD (PMD)), tablet, portable play machine (such as portable game machine), electronic dictionary, car navigation system, personal computer, digital camera, or digital video camera.

The invention claimed is:

1. A protective panel comprising a touch input part, and a peripheral switch arranged in a peripheral part thereof, wherein the protective panel further comprises:
    an upper electrode base material having a touch-input-part upper transparent electrode and a peripheral-switch upper electrode on one surface thereof;
    a lower electrode base material having a touch-input-part lower transparent electrode opposed to the touch-input-part upper transparent electrode with a predetermined space to constitute the touch input part, and a peripheral-switch lower electrode opposed to the peripheral-switch upper electrode with a predetermined space to constitute the peripheral switch, on a surface opposed to the one surface having the touch-input-part upper transparent electrode and the peripheral-switch upper electrode;
    a base-material bonding layer that bonds the upper electrode base material and the lower electrode base material in a peripheral part of the protective panel, and has a through hole to which each of the peripheral-switch upper electrode and the peripheral-switch lower electrode is exposed; and
    a pressure sensitive conductive member arranged in the through hole in the base-material bonding layer and between the peripheral-switch upper electrode and the peripheral-switch lower electrode, and being in contact with at least one of the peripheral-switch upper electrode and the peripheral-switch lower electrode, wherein
    when a force is applied to a part corresponding to the peripheral switch: (i) the applied force is transmitted to the pressure sensitive conductive member through the peripheral-switch upper electrode; (ii) a conductive performance of the pressure sensitive conductive member is changed and a current flows in the pressure sensitive conductive member according to the applied force; and (iii) the peripheral-switch upper electrode and the peripheral-switch lower electrode are electrically connected due to the current flow.

2. The protective panel according to claim 1, wherein the pressure sensitive conductive member is constructed by a insulating coated film containing dispersed conductive particles, and
    when the force is applied to the part corresponding to the peripheral switch, the applied force is transmitted to the insulating coated film through the peripheral-switch upper electrode, the current flows between the conductive particles in the insulating coated film by the applied force, and the peripheral-switch upper electrode and the peripheral-switch lower electrode are electrically connected due to the current flow.

3. The protective panel according to claim 1, wherein the pressure sensitive conductive member has translucency, and each of the peripheral-switch upper electrode and the peripheral-switch lower electrode has translucency.

4. The protective panel according to claim 1, further comprising a decorative sheet arranged on a front surface side of the upper electrode base material, wherein
    an input part of the peripheral switch is covered with a picture of the decorative sheet.

5. The protective panel according to claim 1, comprising a sensitivity adjusting gap provided between the pressure sensitive conductive member and the peripheral-switch upper electrode, or between the pressure sensitive conductive member and the peripheral-switch lower electrode.

6. The protective panel according to claim 1, comprising a sensitivity adjusting gap provided in a middle part of the pressure sensitive conductive member between the peripheral-switch upper electrode and the peripheral-switch lower electrode.

7. An electronic device comprising:
    the protective panel according to claim 1;
    a casing that supports the protective panel; and
    a display device arranged in an inner side of the touch input part of the protective panel in the casing.

8. The protective panel according to claim 1, wherein the conductive performance of the pressure sensitive conductive member increases and decreases based on an amount of the force, such that the amount of the force applied to the part corresponding to the peripheral switch is detected based on the increase and decrease of the conductive performance.

9. The protective panel according to claim 1, wherein an amount of the current flowing in the pressure sensitive conductive member increases and decreases based on an amount of the force, such that the amount of the force applied to the part corresponding to the peripheral switch is detected based on the increase and decrease of the amount of the current flowing.

* * * * *